United States Patent [19]

Sakaguchi et al.

[11] Patent Number: 5,106,343

[45] Date of Patent: Apr. 21, 1992

[54] CONSTANT VELOCITY JOINT

[75] Inventors: Akio Sakaguchi; Yoshimi Kuragasaki, both of Iwata, Japan

[73] Assignee: NTN Corporation, Osaka, Japan

[21] Appl. No.: 547,262

[22] Filed: Jul. 3, 1990

[30] Foreign Application Priority Data

Jul. 17, 1989 [JP] Japan .................... 1-185777

[51] Int. Cl.⁵ .............................. F16D 3/02
[52] U.S. Cl. .................... 464/146; 464/902
[58] Field of Search ............ 464/146, 145, 143, 902

[56] References Cited

U.S. PATENT DOCUMENTS 4,385,899  5/1983  Franklin, Jr. ............ 464/146
4,820,240  4/1989  Girguis ................... 464/145

FOREIGN PATENT DOCUMENTS 53-57341  5/1978  Japan ..................... 464/146
63-2665   1/1988  Japan .

*Primary Examiner*—Thomas R. Hannon
*Attorney, Agent, or Firm*—Armstrong, Nikaido, Marmelstein, Kubovcik & Murray

[57] ABSTRACT

The present invention relates to a constant velocity joint used in power transmission shafts for automobiles and the like, wherein a slight pocket clearance is defined between each torque transmitting ball and a ball pocket, while relative axial movement of an inner member and a cage is allowed, thereby ensuring smooth rolling of balls. During axial displacement, the outer surface of the inner member makes angular contact with the inner surface of the cage always at a constant position, thereby reducing the internal slide resistance between the members.

1 Claim, 3 Drawing Sheets

CONSTANT VELOCITY JOINT

BACKGROUND OF THE INVENTION

1. Field of the Invention

The present invention relates to a constant velocity joint used in power transmission shafts for automobiles and the like and particularly it relates to a constant velocity joint which makes it possible to effect angular displacement and axial displacement between a driving shaft and a driven shaft.

2. Prior Art

This type of constant velocity joint, as shown in FIG. 3, comprises a hollow outer member 3 having a cylindrical hole 2 formed with straight guide grooves 1 parallel with the axis, an inner member 6 having a part-spherical outer surface 5 formed with straight guide grooves 4 parallel with the axis cooperating with the grooves 1 to define ball tracks, torque transmitting balls 7 disposed in the grooves 1 and 4, and a cage 11 having ball pockets 8 for receiving the balls 7 and also having part-spherical inner surface 9 and part-spherical outer surface 10 respectively contact-wise guided by the part-spherical outer surface 5 of the inner member 6 and by the cylindrical hole 2 of the outer member 3 and having centers of curvature shifted axially of the joint on the opposite sides of the ball center plane.

When a crossing angle between the outer member 3 and the inner member 6 is given, and when the joint is located with a torque while axially sliding, the cage 11 functions to retain the torque transmitting balls 7 in the bisecting plane of the crossing angle. The members are lubricated as by grease in view of relative slippage taking place therebetween.

There is a constant velocity joint of this type shown in FIG. 4, wherein the slide resistance of the joint is reduced to allow smooth axial displacement with angular displacement between the outer member 3 and the inner member 6 (see Japanese Utility Model Publication No. 63-2665).

In this constant velocity joint, the inner surface 9 of the cage 11 comprises a cylindrical surface 9a in an axially middle region, and spherical surfaces 9b disposed on the opposite sides thereof, the radius of curvature Rc of the spherical surfaces 9b being seemingly the same as the radius of curvature Ri of the outer surface 5 of the inner member 6. The center of curvature $O_4$ of the outer surface 10 of the cage 11 is axially shifted with respect to the ball center plane P, while the axial center $O_3$ of the inner surface 9 is axially shifted from the ball center plane P by the equal distance in the opposite direction of $O_4$. The centers of curvature $O_1$ and $O_2$ of the spherical surfaces 9b are axially and equally spaced from the $O_3$ on the opposite sides thereof, whereby an axial clearance is defined between the inner surface 9 of the cage 11 and the outer surface 5 of the inner member 6. In addition, in this figure, the center of curvature of the outer surface 5 of the inner member 6 is shown in axial relative positional relation, coinciding with $O_3$. And there is a slight pocket clearance (5-50 $\mu$m) between the torque transmitting ball 7 and the ball pocket 8, which, in this constant velocity joint, coupled with the construction allowing a relative axial short travel of the inner member 6 and the cage 11, enables the ball 7 to roll smoothly, achieving a reduction in the axial slide resistance of the joint.

The constant velocity joint described above is superior in that it ensures smooth rolling of balls and reduction in axial slide resistance of the joint. On the other hand, however, there is still much room for improvement in connection with the interior slide resistance between the members. More particularly, the cage 11 is constructed so that the radius of curvature Rc of the arc 9b of the inner surface 9 is seemingly equal to the radius of curvature Ri of the outer surface 5 of the inner member 6; therefore, when the inner surface 9 of the cage 11 and the outer surface 5 of the inner member 6 come in contact with each other while the cage 11 and the inner member 6 are axially moving relative to each other while making angular displacement owing to scatter in manufacturing tolerance, there occur a variation in slide resistance in the contact region due to the changing contact position and a variation in slide resistance due to time-dependent change. Thus, it has been found that there is much room for improvement so as to reduce the slide resistance of the joint.

SUMMARY OF THE INVENTION

To solve said problem, the present invention provides a constant velocity joint including a hollow outer member having a cylindrical hole formed with straight guide grooves parallel with the axis, an inner member having a part-spherical outer surface formed with straight guide grooves parallel with the axis cooperating with the first-mentioned straight guide grooves to define ball tracks, torque transmitting balls disposed in the grooves, and a cage having ball pockets for receiving the balls and also having a part-spherical outer surface adapted to be contact-wise guided by the cylindrical hole of the outer member and an inner surface adapted to be contact-wise guided by the part-spherical outer surface of the inner member at a position axially shifted from the center of the spherical surface of the outer surface, the constant velocity joint being characterized in that the joint includes a pocket clearance defined between the ball pocket and the torque transmitting ball, the inner surface of the cage having a cylindrical surface in the middle parallel with the axis adapted to contact the outer surface of the inner member, the inner surfaces on the opposite sides of the cylindrical surface having axial clearances allowing the cage and the inner member to axially move a predetermined distance relative to each other, the cage and the inner member making angular contact when the inner member and the cage axially move relative to each other.

The provision of a slight pocket clearance between the torque transmitting ball and the ball pocket, coupled with the construction enabling relative axial movement of the inner member and the cage, makes it possible for balls to roll smoothly. Further, during axial displacement, the outer surface of the inner member makes angular contact with the inner surface of the cage always at a constant position on the inner surface, so that the interior slide resistance between the members is low and the axial slide resistance of the entire joint is reduced to a minimum.

DESCRIPTION OF THE PREFERRED EMBODIMENTS

Figure 1:
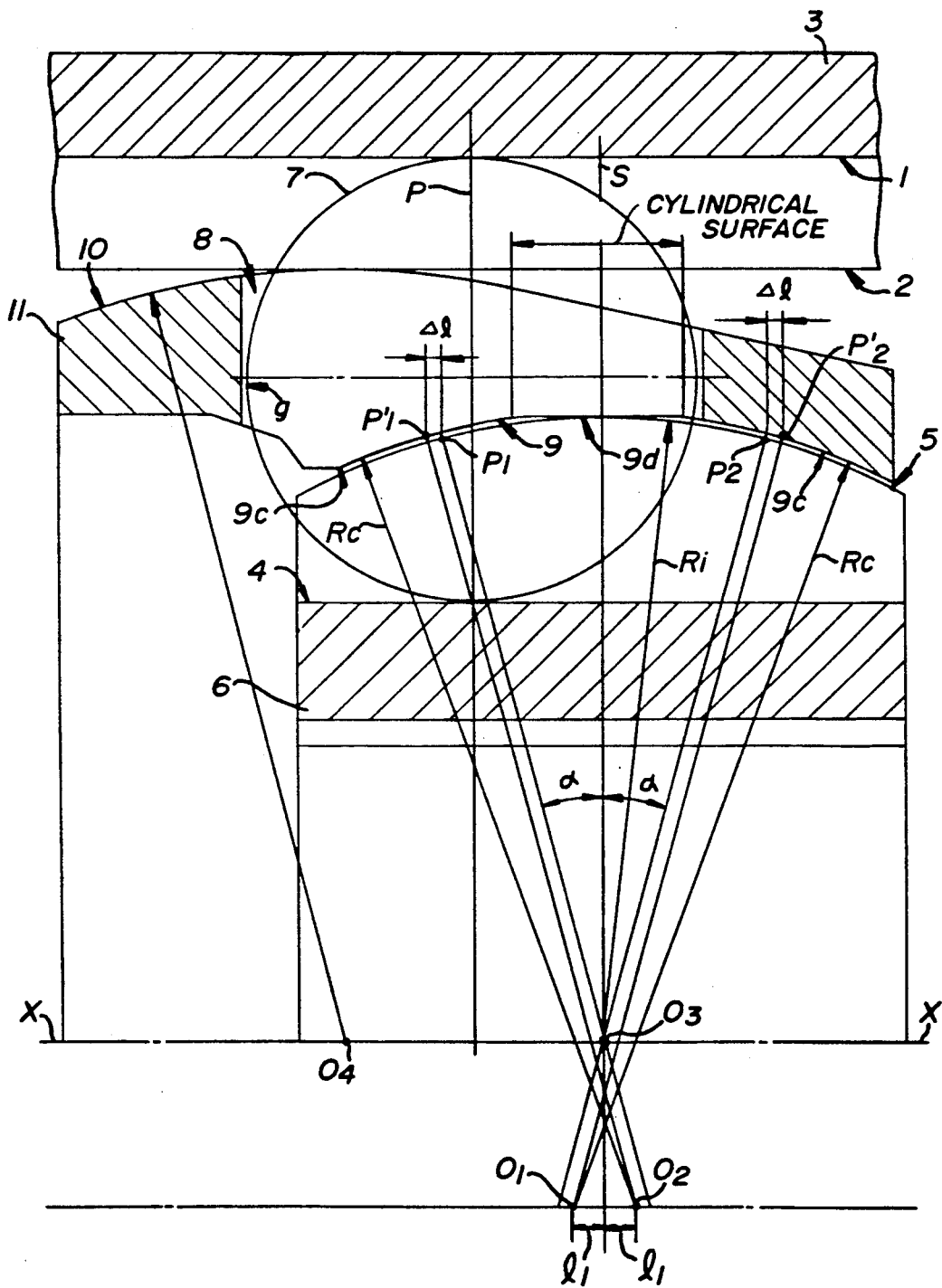
FIG. 1 is an enlarged longitudinal sectional side view showing an embodiment of a constant velocity joint according to the present invention.

FIG. 1 is an enlarged longitudinal sectional side view showing an embodiment of a constant velocity joint according to the present invention, wherein the names and reference characters of the members are the same as those in the prior art; therefore, a repetitive description thereof is omitted.

The center of curvature of the outer surface 10 of the cage 11 is shown at $O_4$, and the axial center plane S of the inner surface 9 which is orthogonal to the axis X—X is axially shifted from the ball center plane P by the equal distance in the opposite direction of $O_4$. The inner surface 9 of the cage 11 is defined by two arcs 9c having their centers of curvature $O_1$ and $O_2$ axially shifted from the axial center plane S to the opposite sides by equal distances l1 and l1 and also radius of curvature Rc which are greater than the radius of curvature Ri of the outer surface 5 of the inner member 6 having a center of curvature $O_3$ located on the axis X—X. The state of FIG. 1 shows the axial center plane S of the inner surface 9 of the cage 11 coinciding with the axial center plane of the inner member 6.

The contact points $P_1$ and $P_2$ on the outer surface 5 of the inner member 6 are located at positions angularly spaced by an equal angle $\alpha$ from the axial center plane S.

The centers of curvature $O_1$ and $O_2$ of the two arcs 9c are located on the opposite sides of and axially spaced from the axial center plane S so as to define axial clearance by an amount of $\Delta l$ between the contact point $P_1'$ and $P_2'$ on the cage 11 and the contact point $P_1$ and $P_2$ on the inner member 6.

Therefore, when the inner member 6 is axially moved relative to the cage 11, the inner surface 9 of the cage 11 makes angular contact with the outer surface 5 of the inner member 6.

In addition, a cylindrical surface 9d parallel with the axis is formed between the two arcs 9c, as shown in FIG. 1. This cylindrical surface 9d is contacted with the outer surface 5 of the inner member 6 and is thereby guided. In FIG. 1, the cylindrical surface 9d and the outer surface 5 are shown closely contacted with each other for the convenience of description. However, it is to be understood that in practice there is a radial guide clearance therebetween.

The angle of contact $\alpha$ between the outer surface 5 of the inner member 6 and the inner surface 9 of the cage 11 is preferably determined so that contact takes place at positions $P_1'$ and $P_2'$ which result from dividing the inner surface 9 of the cage 11 into four axially equal lengths, though the invention is not limited thereto.

Further, the distance l1 of the center of curvature $O_1$ and $O_2$ of the arcs 9c from the center plane S is geometrically determined by the radius of curvature Rc of the arcs 9c and the angle of contact $\alpha$.

The radius of curvature Rc of the arcs 9c is greater than the radius of curvature Ri of the outer surface 5 of the inner member 6; the arcs 9c may be substantially linear depending on conditions.

Figure 2:
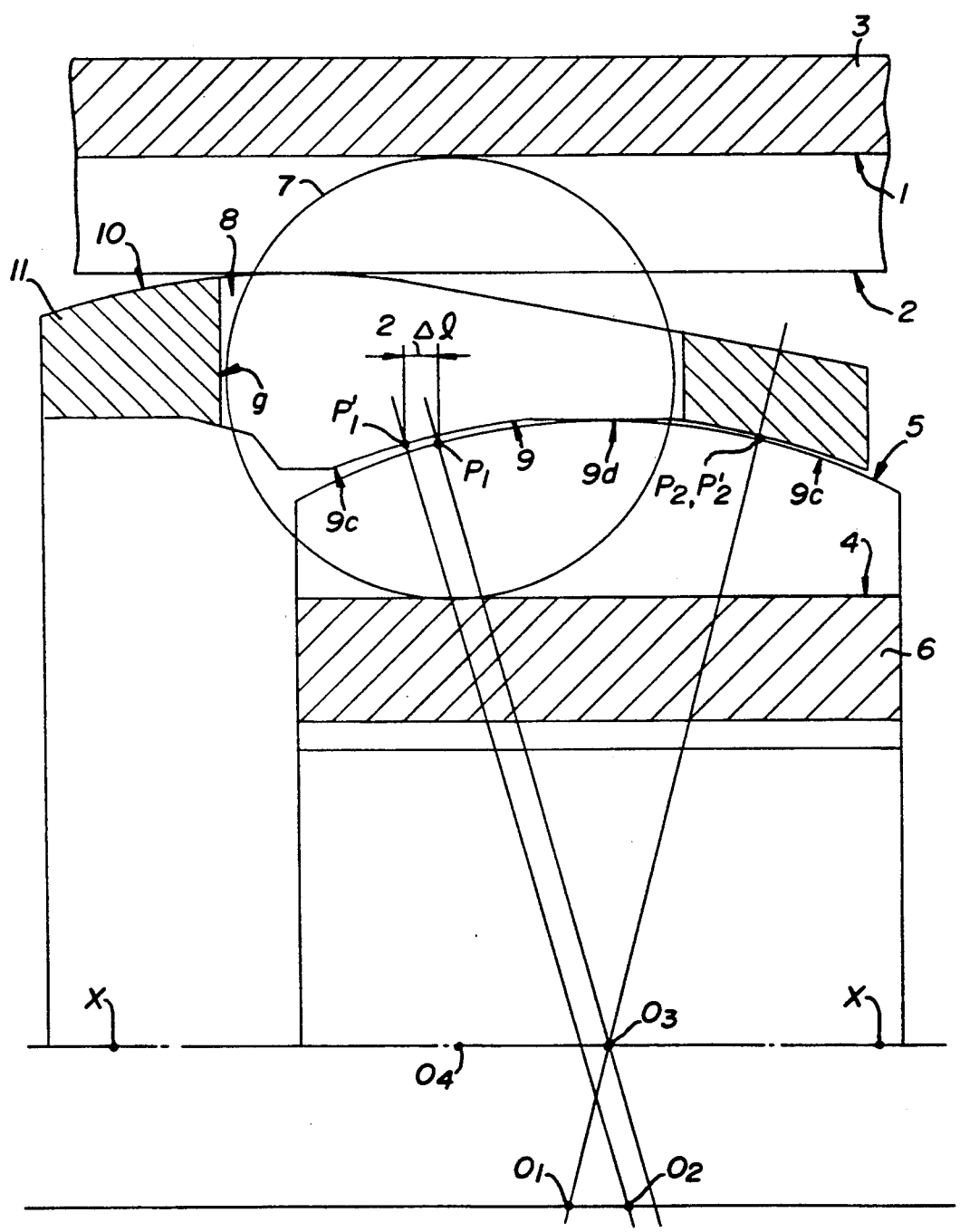
FIG. 2 is an enlarged longitudinal sectional side view of the constant velocity joint, showing an inner member and a cage axially displaced relative to each other in FIG. 1.
Figure 3:
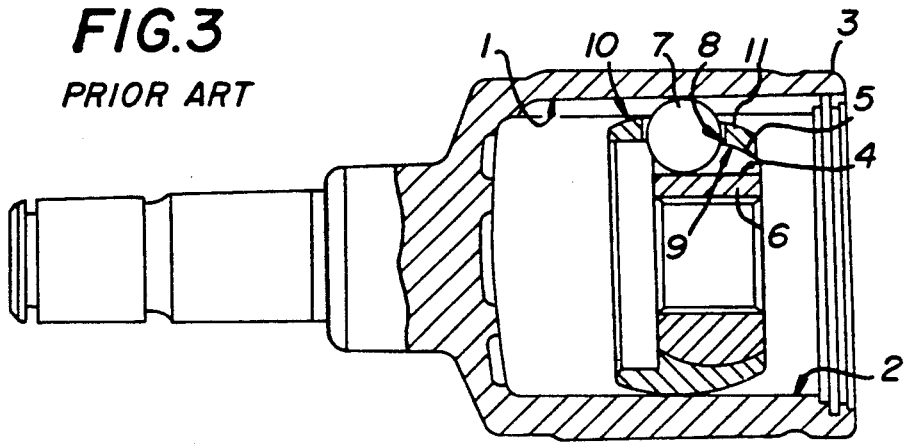
FIG. 3 is an overall schematic sectional side view showing the general arrangement of this type of constant velocity joint.
Figure 4:
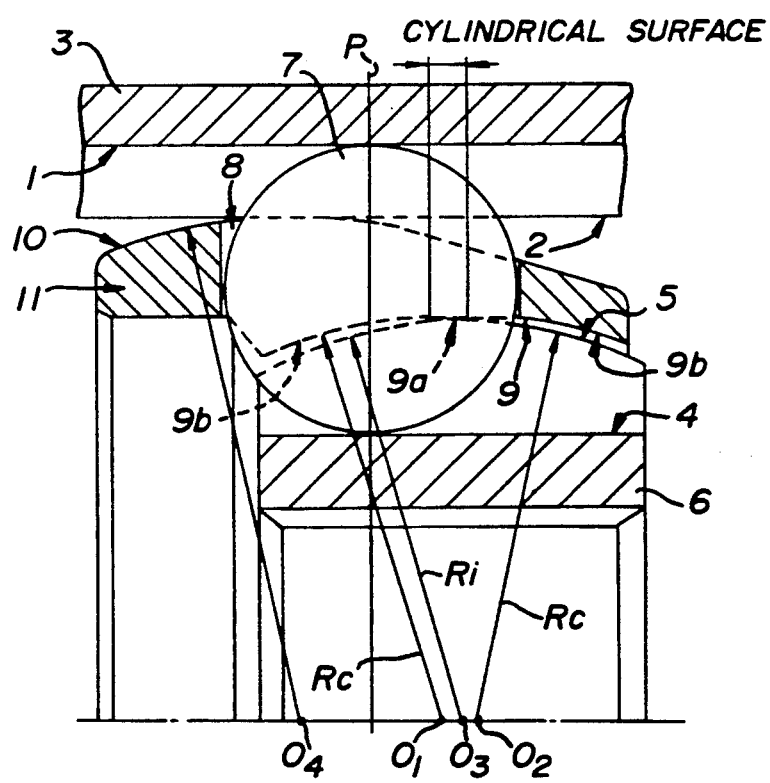
FIG. 4 is a longitudinal sectional side view of a conventional constant velocity joint.

FIG. 2 shows the inner member 6 and the cage 11 are axially moved relative to each other until they make angular contact with each other. There is an axial clearance of $2\Delta l$ between the inner surface 9 of the cage 11 and the outer surface 5 of the inner member 6.

On the other hand, a slight pocket clearance g of about 5-50 $\mu$m is defined between the torque transmitting ball 7 and the ball pocket 8 of the cage 11 to allow smooth rolling of the torque transmitting ball 7.

The constant velocity joint of the present invention is constructed in the manner described above. The operation will now be described.

In FIG. 2, the cage 11 and the inner member 6 are capable of axial displacement relative to each other by an amount equal to the axial clearance $2\Delta l$. Furthermore, there is a pocket clearance g between the ball pocket 8 of the cage 11 and the torque transmitting ball 7. Therefore, when the outer member 3 and the inner member 6 freely rotate with angular displacement, the torque transmitting ball 7 smoothly rolls axially between the linear guide groove 1 of the outer member 3 and the linear guide groove 4 of the inner member 6.

During axial displacement, the outer surface 5 of the inner member 6 makes angular contact with the inner surface 9 of the cage 11 always at the same position $P_1'$ or $P_2'$. Therefore, during transmission of torque attended by angular displacement and axial displacement between the outer member 3 and the inner member 6, the internal slide resistance exerted between the contact surfaces of the members is reduced and grease is introduced into wedge-shaped spaces defined on the opposite sides of the contact region $P_1'$ or $P_2'$ (see FIG. 2) to provide satisfactory lubrication. Therefore, the axial slide resistance in the entire joint is reduced to a minimum. The result will be more effective if the surface of the cage is parkerized and then coated with $MoS_2$.

According to the invention, the provision of a slight pocket clearance between the torque transmitting ball and the ball pocket, coupled with the construction enabling relative axial movement of the inner member and the cage, makes it possible for balls to roll smoothly. Further, during axial displacement, the outer surface of the inner member makes angular contact with the inner surface of the cage always at a constant position on the inner surface, so that the interior slide resistance between the members is low and the axial slide resistance in the entire joint is reduced to a minimum.

What is claimed is:

1. A constant velocity joint including a hollow outer member having a cylindrical hole formed with straight guide grooves parallel with the axis, an inner member having a part-spherical outer surface formed with straight guide grooves parallel with the axis cooperating with the first-mentioned straight guide grooves to define ball tracks, torque transmitting balls disposed in said grooves, and a cage having ball pockets for receiving said balls and also having a part-spherical outer surface adapted to be contact-wise guided by the cylindrical hole of said outer member and an inner surface adapted to be contact-wise guided by the part-spherical outer surface of said inner member at a position axially shifted from the center of the spherical surface of said outer surface, said constant velocity joint being characterized in that said joint includes a pocket clearance defined between the ball pocket and the torque transmitting ball, the inner surface of the cage having a cylindrical surface in the middle parallel with the axis adapted to contact the outer surface of the inner member, the inner surfaces on the opposite sides of said cylindrical surface having axial clearances allowing the cage and the inner member to axially move a predetermined distance relative to each other and being shaped so that the outer surface of said inner member makes angular contact with the inner surface of said cage at one of two constant positions ($P'_1$ or $P'_2$) with a constant contact angle ($\alpha$) when the inner member and the cage axially move relative to each other.

* * * * *